United States Patent Office
3,558,593
Patented Jan. 26, 1971

3,558,593
WATER-INSOLUBLE MONOAZO DYESTUFFS AND PROCESS FOR PREPARING THEM
Helmut Lindner, Frankfurt am Main, Karl Sommer, Konigstein, Taunus, and Heinz Schmidt, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed July 18, 1967, Ser. No. 654,086
Claims priority, application Germany, July 30, 1966, F 49,836
Int. Cl. C07c *107/06;* C09b *29/04*
U.S. Cl. 260—207.1                                6 Claims

ABSTRACT OF THE DISCLOSURE

Water-insoluble monoazo dyestuffs of the general formula

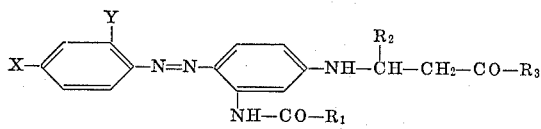

wherein X represents a nitro or nitrile group, Y represents a hydrogen or halogen atom, or a nitro or nitrile goup, $R_1$ represents a lower alkyl or phenyl radical, $R_2$ represents a methyl, phenyl, chlorophenyl, hydroxyphenyl or methylenedioxyphenyl radical, and $R_3$ represents a methyl, phenyl, hydroxyphenyl or lower alkoxy group, and a process for preparing said dyestuffs.

---

The present invention relates to new water-insoluble monoazo dyestuffs and to a process for preparing them; in particular it relates to new water-insoluble monoazo dyestuffs of the general Formula 1

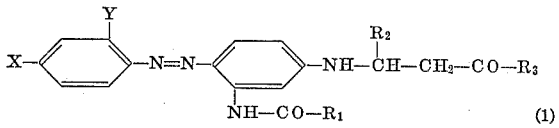
(1)

wherein X represents a nitro or a nitrile group, Y represets a hydrogen or a halogen atom, a nitro or a nitrile group, $R_1$ represents a lower alkyl or a phenyl radical, $R_2$ represents a methyl radical or a phenyl radical which, if desired may be substituted by a chlorine atom, a hydroxy or a methylenedioxy group and $R_3$ represents a methyl radical, a phenyl radical which may be substituted by a hydroxy group, or a lower alkoxy group.

It has been found that the new water-insoluble monoazo dyestuffs of the general Formula 1 can be obtained by diazotizing aromatic amines of the general formula 2

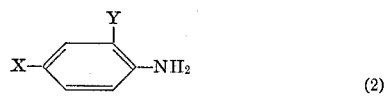
(2)

wherein X and Y have the meaning given above, and coupling in an acid medium, suitably at a pH value of between 0 and 6.8, preferably between 0 and 3, with coupling components of the general Formula 3

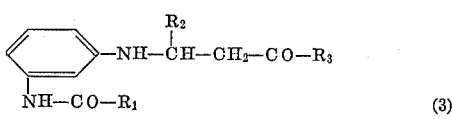
(3)

wherein $R_1$, $R_2$ and $R_3$ have the meaning given above.

As diazo components can be used for example the following amines:

4-nitroaniline, 2-chloro-4-nitro-aniline, 2-bromo-4-nitro-aniline, 2,4-dinitro-aniline, 2-cyano-4-aniline, 2-nitro-4-cyano-aniline.

The coupling components used according to the process of the present invention can be prepared for example by condensing primary aromatic amines of the general formula 4

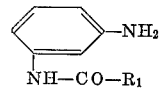
(4)

wherein $R_1$ has the meaning given above, with keto compounds of the general formula 5

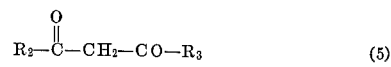
(5)

wherein $R_2$ and $R_3$ have the meanings given above, and hydrogenating the Schiff's bases so formed to the coupling components of Formula 3. Thus there is obtained for example by condensation of 3-amino-acetanilide with acetylacetone and subsequent hydrogenation of the Schiff's base which has formed, the coupling component of Formula 6

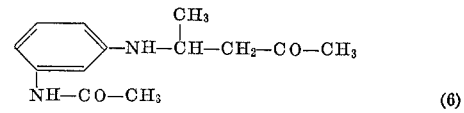
(6)

Another method for preparing the coupling components of Formula 3 used as starting substances for the process of the present invention is to add primary aromatic amines of the Formula 4, wherein $R_1$ has the meaning given above, on α,β-unsaturated keto compounds of the general Formula 7

$$R_2\text{---}CH=CH\text{---}CO\text{---}R_3 \qquad (7)$$

wherein $R_2$ and $R_3$ have the meanings given above. Thus, for example, by addition of 3-amino-acetanilide to benzalacetophenone of the Formula 8

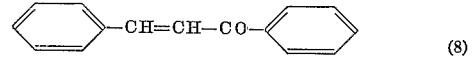
(8)

in a strong alkaline medium, the coupling component of Formula 9

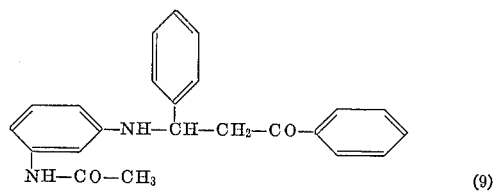
(9)

is obtained.

The new water-insoluble monoazo dyestuffs obtainable according to the process of the present invention are valuable dispersion dyestuffs which can be further treated in usual manner with dispersing agents to give dyeing preparations. On synthetic fibres, such as cellulose triacetate fibres, cellulose 2½ acetate fibres, polyamide and polyurethane fibres, but especially on polyester fibres, such as polyethylene terephthalate fibres, these dyeing preparations yield, at a very good building up, dyeings and prints having a high tinctorial strength and excellent fastness to light, thermofixation and wet processing. In addition, the dyestuffs prove considerably insensitive to agents having alkaline action.

For dyeing material of polyester fibres, it is suitable to apply the new dyestuffs in the form of the afore-mentioned dyeing preparations in an aqueous suspension at temperatures above 100° C. and under pressure, or at a temperature of about 100° C. with addition of the usual carriers. Furthermore intense dyeings are obtained by impregnating fabrics and hosieries made of polyester materials with a suspension of the new dyestuffs, drying the treated goods and then submitting them for a short period to the action of heat, for example at 190° to 210° C. The dyestuffs are very appropriate for dyeing mixed fibrous materials containing polyester portions, for example mixtures of polyester fibres with wool or cotton. When dyeing a polyester-wool mixture the wool portion obtains a weak coloration whereas the polyester portion gives a good yield of dyestuff being fixed. The wool coloration can easily be removed by an after-treatment with reducing agents or with emulsifiers.

Coupling components of Formula 3, wherein $R_1$ represents a phenyl radical, $R_2$ represents a methyl group and $R_3$ a lower alkoxy group, such for example, as in the coupling component of Formula 10

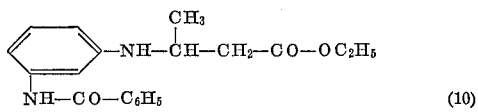

(10)

given, when coupled with diazonium salts of amines of Formula 2, dispersion dyestuffs that can be further treated in usual manner with dispersing agents to obtain dyeing preparation which, on polyamide and polyurethane fibres, give intense dyeings that have good fastness to light, excellent fastness to wet processing and good fastness to fixation.

In comparison to the dyestuffs of next comparable structure which are known from the French Pat. No. 1,413,474, those of the present invention are distingushed by a better fastness to light.

The following examples serve to illustrate the invention but they are not intended to limit it thereto, the parts being by weight unless otherwise stated.

EXAMPLE 1

18.3 parts of 2.4-dinitro-aniline are introduced into a mixture consisting of 70 parts of concentrated sulfuric acid and 31 part of nitrosyl sulfuric acid of 41% strength at 15°–20° C., and the batch is stirred at room temperature for 1 hour. Then a specimen of the diluted reaction mixture is to show still a small excess of nitrous acid. Subsequently, the diazonium salt solution obtained is poured on 250 parts of ice and it is filtered.

23.4 parts of a coupling component—obtained by condensation of 3-aminoacetanilide and acetylacetone and subsequent hydrogenation of the Schiff's base formed— are dissolved in 150 parts by volume of 2 N sulfuric acid. To this solution 500 parts of ice are added and the whole is poured into the recently prepared diazonium salt solution. After 15 minutes, 100 parts of crystallized soduim acetate are added to the coupling suspension and the pH-value is adjusted to about 3 by means of concentrated sodium hydroxide solution. Stirring of the dyestuff suspension is continued for 15 hours, the product of this process is filtered off, and it is washed with 5000 parts by volume of water. The dark filter cake gives after drying 38.5 parts of the dyestuff of the formula

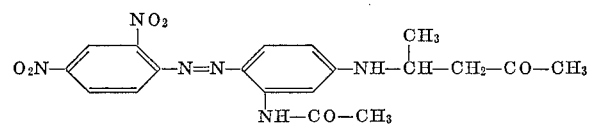

On polyester fibres with the dyestuff in finely dispersed form, intense reddish violet dyeings of excellent fastness to light and thermofixation are obtained.

EXAMPLE 2

16.3 parts of 2-cyano-4-nitro-anilene are dissolved at about 20° C. in 50 parts by volume of concentrated sulfuric acid. 31 parts of nitrosyl sulfuric acid of 41% strength are added dropwise at 10°–15° C., and the batch is stirred for 1 hour at room temperature.

40.9 parts of a coupling component—obtained by condensation of o-chloro-benzaldehyde and o-hydroxy-acetophenone in a strong alkaline and alcoholic medium and subsequent addition of 3-amino-aceto-anilide on the $\alpha,\beta$-unsaturated ketone thus formed—are dissolved in 40 parts by volume of concentrated hydrochloric acid and 500 parts by volume of water. To this solution 500 parts of ice are added and then the diazonium sulfate solution is poured in. After 1 hour the pH-value of the coupling mixture is adjusted to about 4 by means of concentrated sodium hydroxide solution, and stirring of the dyestuff suspension is continued for 15 hours. Then the product of this process is filtered off, washed with 5000 parts by volume of water and dried. There are obtained 54 parts of the dyestuff of the formula

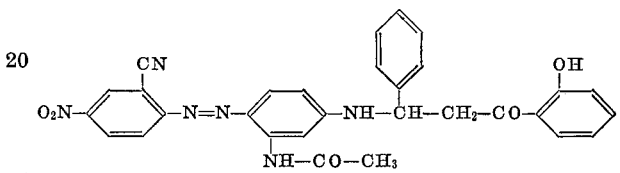

which is ground and dispersed in the usual way. The dyestuff preparation thus obtained yields on polyester fibres bluish red dyeings of excellent fastness to light and to thermofixation.

EXAMPLE 3

18.3 parts of 2.4-dinitro-aniline are introduced into a mixture consisting of 100 parts by volume of glacial acetic acid and 20 parts by volume of propionic acid, and diazotized at 10–15° C. with 31 parts nitrosyl sulfuric acid of 41% strength. After stirring for 1 hour there remains a small excess of nitrous acid.

27.8 parts of a coupling component—obtained by condensation of aceto acetic acid ethyl ester with 3-aminopropionic acid anilide and subsequent hydrogenation of the condensation product formed—are dissolved in 150 parts by volume of glacial acetic acid. To this solution the solution of the diazonium acetate is added dropwise, the coupling mixture is stirred for 1 hour and the dyestuff solution is poured into a mixture consisting of 1000 parts by volume of water and 1000 parts of ice, while stirring. The dyestuff suspension is stirred for 15 hours, the product of this process is filtered off with suction, and washed with 5000 parts by volume of water. After drying the filter cake, there are obtained 42.5 parts of the dyestuff of the formula

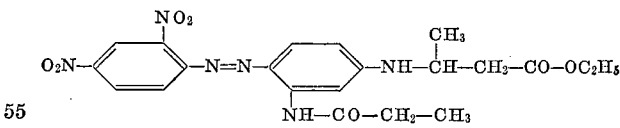

which after dispersing on polyester yields clear reddish violet dyeings of excellent fastness to light and to thermofixation.

EXAMPLE 4

13.8 parts of 4-nitro-aniline are introduced into a mixture consisting of 100 parts by volume of glacial acetic acid and 20 parts by volume of propionic acid, and diazotized at 10°–15° C. with 31 parts of nitrosyl-sulfuric acid of 41% strength.

32.6 parts of a coupling component—obtained by condensation of 3-amino-1-benzoylamino-benzene with aceto acetic acid ethyl ester and subsequent hydrogenation of the condensation product formed—are dissolved in 150 parts by volume of glacial acetic acid. The solution of the diazonium acetate is added dropwise into the solution of the coupling component, the coupling mixture is stirred for 1 hour, and subsequently poured into a mixture of 500 parts by volume of water and 500 parts of ice, while well stirring. After stirring for 17 hours the product of this process is filtered off, washed and dried. There are obtained 46 parts of the dyestuff of the formula

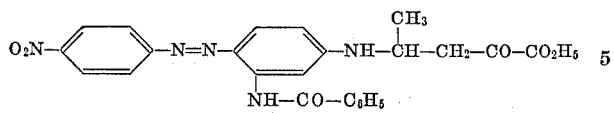

which after dispersing in the usual manner gives a dyestuff preparation. Applied on polyamide fibres this preparation yields dyeings which are distinguished particularly in the manner that at a good fastness to light they moreover possess an excellent fastness to wet processing and to fixation.

In the following table further examples of dyestuffs of Formula 1 are indicated, which are obtained by diazotizing aromatic amines of Formula 2 and coupling with coupling components of Formula 3. The last column gives the tint which is obtained when dyeing on polyester fibres.

| No. | Diazo component | $R_1$ | $R_2$ | $R_3$ | Tint on polyester |
|---|---|---|---|---|---|
| 5 | 2-chloro-4-nitro-aniline | Methyl | Methyl | Methyl | Red. |
| 6 | do | Phenyl | do | do | Do. |
| 7 | 4-nitro-aniline | do | do | do | Scarlet. |
| 8 | 2,4-dinitro-aniline | do | do | do | Violet. |
| 9 | 2-cyano-4-nitro-aniline | do | do | do | Do. |
| 10 | do | Methyl | do | Ethoxy | Do. |
| 11 | 2,4-dinitro-aniline | do | do | do | Do. |
| 12 | 2-chloro-4-nitro-aniline | Ethyl | do | do | Scarlet. |
| 13 | 2-cyano-4-nitro-aniline | do | do | do | Bluish red. |
| 14 | 2-chloro-4-nitro-aniline | Phenyl | do | do | Red. |
| 15 | 2,4-dinitro-aniline | do | do | do | Bluish red. |
| 16 | 2-cyano-4-nitro-aniline | do | do | do | Do. |
| 17 | 2-nitro-4-cyano-aniline | do | do | do | Scarlet. |
| 18 | 2-chloro-4-nitro-aniline | Methyl | 3,4-methylene dioxy-phenyl | o-Hydroxy phenyl | Do. |
| 19 | 2-cyano-4-nitro-aniline | do | do | do | Bluish red. |
| 20 | 2-chloro-4-nitro-aniline | do | o-Chloro-phenyl | do | Scarlet. |
| 21 | 2-cyano-4-nitro-aniline | do | do | do | Bluish red. |
| 22 | 2-chloro-4-nitro-aniline | do | Phenyl | do | Yellowish red. |
| 23 | 2-cyano-4-nitro-aniline | do | do | do | Bluish red. |
| 24 | 2,4-dinitro-aniline | do | o-Hydroxy phenyl | Phenyl | Do. |

We claim:
1. A water-insoluble monazo dyestuff of the formula

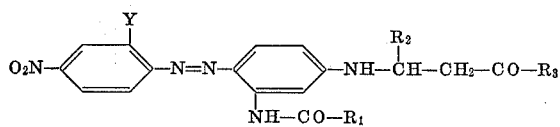

wherein Y is a hydrogen, chlorine or nitro group, $R_1$ is a methyl or phenyl group, $R_2$ is a lower alkyl group, and $R_3$ is a methyl or lower alkoxy group.

2. The water-insoluble monoazo dyestuff of the formula

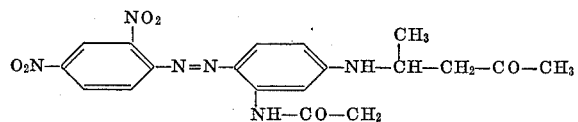

3. The water-insoluble monoazo dyestuff of the formula

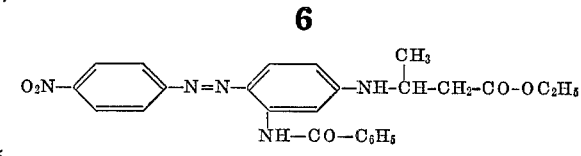

4. The water-insoluble monoazo dyestuff of the formula

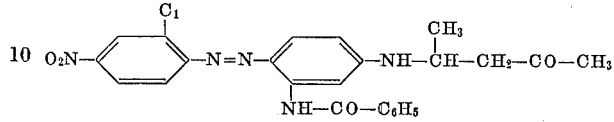

5. The water-insoluble monoazo dyestuff of the formula

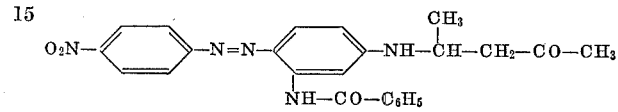

6. The water-insoluble monoazo dyestuff of the formula

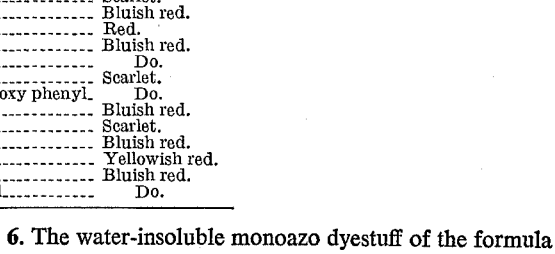

References Cited
UNITED STATES PATENTS

| 2,470,094 | 5/1949 | Dickey, et al. | 260—207.1(X) |
| 3,250,763 | 5/1966 | Gies, et al. | 260—207 |
| 3,406,165 | 10/1968 | Kruckenberg | 260—207.1 |

FOREIGN PATENTS

| 745,457 | 3/1944 | Germany | 260—207.1 |
| 1,413,474 | 8/1965 | France | 260—207.1 |

JOSEPH P. BRUST, Primary Examiner

C. F. WARREN, Assistant Examiner

U.S. Cl. X.R.

8—41, 50